United States Patent
Higashiyama et al.

(10) Patent No.: US 10,928,632 B2
(45) Date of Patent: Feb. 23, 2021

(54) DISPLAY DEVICE, DISPLAY CONTROL METHOD, AND STORAGE MEDIUM

(71) Applicant: HONDA MOTOR CO., LTD., Tokyo (JP)

(72) Inventors: Masafumi Higashiyama, Wako (JP); Takuya Kimura, Wako (JP); Shinji Kawakami, Wako (JP); Yuji Kuwashima, Wako (JP); Tatsuya Iwasa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/655,332

(22) Filed: Oct. 17, 2019

(65) Prior Publication Data
US 2020/0124851 A1 Apr. 23, 2020

(30) Foreign Application Priority Data

Oct. 19, 2018 (JP) .............................. JP2018-197948

(51) Int. Cl.
*G02B 27/01* (2006.01)
*B60K 35/00* (2006.01)

(52) U.S. Cl.
CPC .......... *G02B 27/0149* (2013.01); *B60K 35/00* (2013.01); *G02B 27/0101* (2013.01); *B60K 2370/1529* (2019.05); *G02B 2027/014* (2013.01); *G02B 2027/0159* (2013.01)

(58) Field of Classification Search
CPC ............ G02B 27/0149; G02B 27/0101; G02B 2027/014; G02B 2027/0159; B60K 35/00; B60K 2370/1529
See application file for complete search history.

(56) References Cited

U.S. PATENT DOCUMENTS

2016/0313562 A1* 10/2016 Saisho ............... G02B 27/0179
2017/0309049 A1  10/2017 Law et al.

FOREIGN PATENT DOCUMENTS

| JP | 05-139186 | 6/1993 |
|----|-----------|--------|
| JP | 06-115381 | 4/1994 |
| JP | 11-119147 | 4/1999 |
| JP | 2015-101311 | 6/2015 |
| JP | 2017-091115 | 5/2017 |
| JP | 2017-122894 | 7/2017 |
| WO | 2017/134865 | 8/2017 |

OTHER PUBLICATIONS

Japanese Office Action for Japanese Patent Application No. 2018-197948 dated Jun. 30, 2020.

* cited by examiner

*Primary Examiner* — Kenneth B Lee, Jr.
(74) *Attorney, Agent, or Firm* — Amin, Turocy & Watson, LLP

(57) ABSTRACT

A display device mounted in a vehicle includes a light projecting device configured to project light including an image, an optical mechanism provided on a path of the light, an actuator configured to drive the optical mechanism to adjust a distance from a predetermined position to a position where the light is formed as a virtual image, and a control device configured to control the light projecting device and the actuator, wherein the control device is configured to drive the actuator on the basis of a speed of the vehicle to adjust a projection position on a projection surface of the light projected from the light projecting device.

11 Claims, 8 Drawing Sheets

| DRIVER IDENTIFICATION INFORMATION | DATE AND TIME | BEHAVIOR CONTENT ||
|---|---|---|---|
| | | VEHICLE SPEED FLUCTUATIONS | INTER-VEHICLE DISTANCE |
| 0001 | * * * | * * * | * * * |
| 0002 | * * * | * * * | * * * |
| ... | ... | ... | ... |

DISPLAY DEVICE, DISPLAY CONTROL METHOD, AND STORAGE MEDIUM

CROSS-REFERENCE TO RELATED APPLICATION

Priority is claimed on Japanese Patent Application No. 2018-197948, filed Oct. 19, 2018, the content of which is incorporated herein by reference.

BACKGROUND

Field of the Invention

The present invention relates to a display device, a display control method, and a storage medium.

Description of Related Art

A head-up display device (hereinafter referred to as an HUD device) which displays an image regarding information for a driver on a front windshield is known in the related art (for example, Japanese Unexamined Patent Application, First Publication No. 2017-91115). Using this HUD device, obstacles, alerts, or various signs indicating traveling directions can be displayed overlapping the landscape in front of the vehicle at a predetermined position on the front windshield, whereby the driver can identify various displayed information while maintaining the direction of his or her line of sight for driving forward.

SUMMARY

Here, it is conceivable that the display position of the image displayed by the HUD device be changed according to the situation of the vehicle. However, if drive control of an actuator for position adjustment is not specially devised, the durability of the actuator may be lowered.

Aspects of the present invention have been made in view of such circumstances and it is an object of the present invention to provide a display device, a display control method, and a storage medium which can improve this durability.

The display device, the display control method, and the storage medium according to the present invention adopt the following configurations.

The display device, the display control method, and the storage medium according to the present invention adopt the following configurations.

(1) A display device according to an aspect of the present invention is a display device mounted in a vehicle, the display device including a light projecting device configured to project light including an image, an optical mechanism provided on a path of the light, an actuator configured to drive the optical mechanism to adjust a distance from a predetermined position to a position where the light is formed as a virtual image, and a control device configured to control the light projecting device and the actuator, wherein the control device is configured to drive the actuator on the basis of a speed of the vehicle to adjust a projection position on a projection surface of the light projected from the light projecting device.

(2) In the display device according to the above aspect (1), the control device is configured to drive the actuator to increase the distance as the speed of the vehicle increases and to decrease the distance as the speed of the vehicle decreases.

(3) In the display device according to the above aspect (1) or (2), the control device is configured to drive the actuator to decrease an angle formed between a horizontal plane passing through a viewer's sight position and a line segment from the sight position to the position where the light is formed as the virtual image as the speed of the vehicle increases and to increase the angle as the speed of the vehicle decreases.

(4) In the display device according to the above aspect (1), the control device is configured to lower responsiveness relating to drive control of the actuator when a behavior of the vehicle corresponding to an operation of a driver of the vehicle satisfies a predetermined condition as compared to when the behavior does not satisfy the predetermined condition.

(5) In the display device according to the above aspect (4), the predetermined condition is that a magnitude of a fluctuation of the speed of the vehicle be greater than or equal to a first threshold value or that an inter-vehicle distance between the vehicle and a preceding vehicle be equal to or less than a second threshold value.

(6) A display control method according to an aspect of the present invention is a display control method for a display device including a light projecting device configured to project light including an image, an optical mechanism provided on a path of the light, an actuator configured to drive the optical mechanism to adjust a distance from a predetermined position to a position where the light is formed as a virtual image, and a control device configured to control the light projecting device and the actuator, the display control method including the display device acquiring a speed of a vehicle in which the display device is mounted, and driving the actuator on the basis of the acquired speed of the vehicle to adjust a projection position on a projection surface of the light projected from the light projecting device.

(7) A storage medium according to an aspect of the present invention is a computer-readable non-transitory storage medium storing a program causing a display device including a light projecting device configured to project light including an image, an optical mechanism provided on a path of the light, an actuator configured to drive the optical mechanism to adjust a distance from a predetermined position to a position where the light is formed as a virtual image, and a control device configured to control the light projecting device and the actuator to acquire a speed of a vehicle in which the display device is mounted, and drive the actuator on the basis of the acquired speed of the vehicle to adjust a projection position on a projection surface of the light projected from the light projecting device.

According to the above aspects (1) to (7), it is possible to improve the durability.

BRIEF DESCRIPTION OF THE DRAWINGS

FIG. 5 is a diagram showing an example of the content of vehicle behavior information.

DESCRIPTION OF EMBODIMENTS

Hereinafter, embodiments of a display device, a display control method, and a storage medium of the present invention will be described with reference to the drawings. The display device of an embodiment is, for example, a device which is mounted in a vehicle (hereinafter referred to as a vehicle M) and allows an image to be viewed such that it is superimposed on a landscape. The display device can be referred to as an HUD device. An example of the display device is a device which projects light including an image on a front windshield of the vehicle M to allow a viewer to view a virtual image. The viewer is, for example, a driver, but may also be an occupant other than the driver. The display device may be realized by a light transmissive display device (for example, a liquid crystal or an organic electro-luminescence (EL) display) attached to the front windshield of the vehicle M. Light may also be projected on a transparent member (such as a visor or a lens of glasses) included in a device which a human being mounts on his or her body or a light transmissive display device may be attached to such a device. In the following description, it is assumed that the display device is a device which is mounted in the vehicle M and projects light including an image on the front windshield.

In the following description, positional relationships and the like will be described using an XYZ coordinate system as appropriate.

[Overall Structure]

Figure 1:
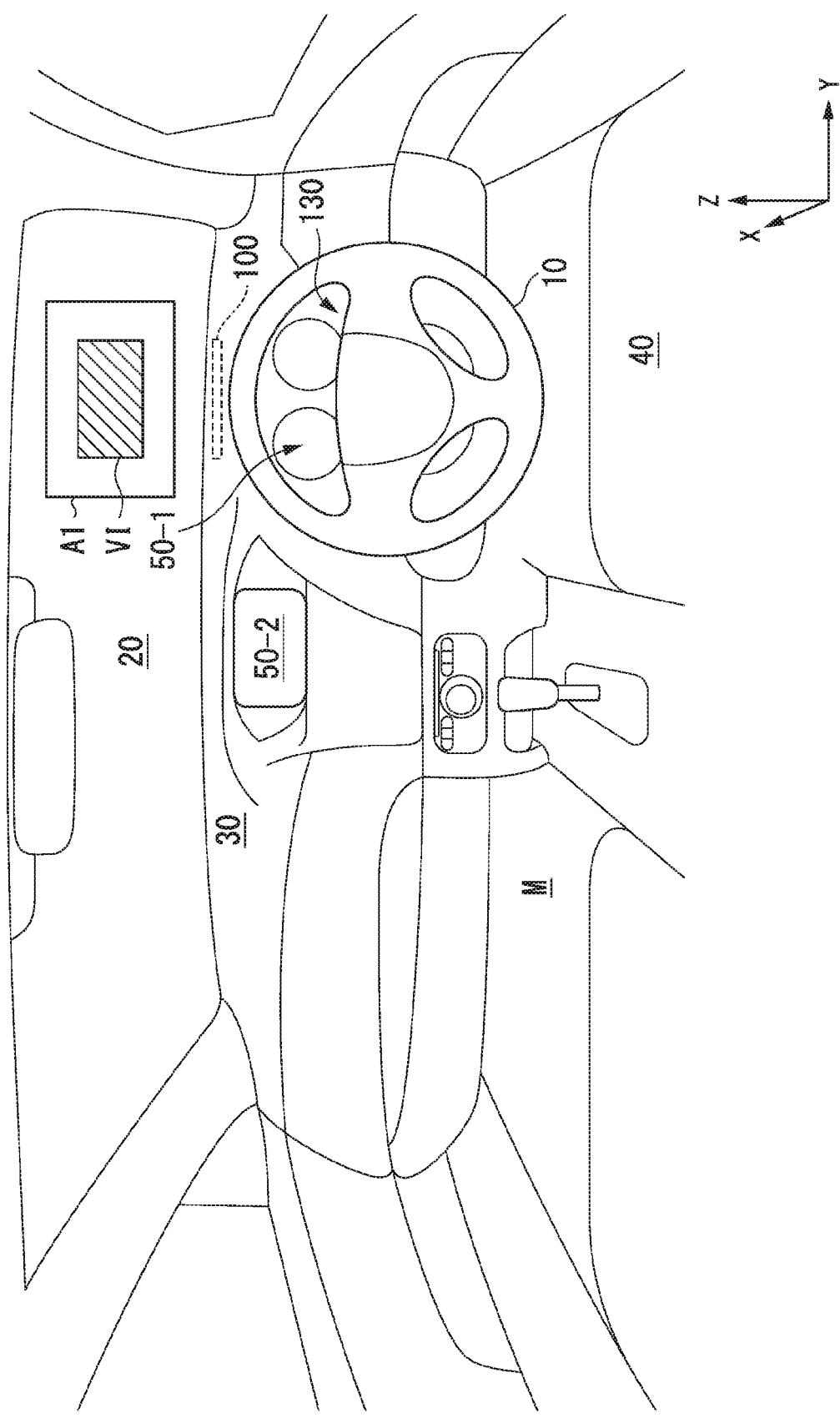
FIG. 1 is a diagram exemplifying a configuration of an occupant compartment of a vehicle M in which a display device according to an embodiment is mounted.

FIG. 1 is a diagram exemplifying a configuration of an occupant compartment of a vehicle M in which a display device 100 according to an embodiment is mounted. The vehicle M is provided with, for example, a steering wheel 10 for controlling the steering of the vehicle M, a front windshield (an example of the reflector) 20 that separates the occupant compartment and the outside of the vehicle from each other, and an instrument panel 30. The front windshield 20 is a light transmissive member. The display device 100 allows a driver seated on a driver's seat 40 to view a virtual image VI, for example, by projecting (casting) light including an image on a displayable area A1 provided on a portion of the front windshield 20 in front of the driver's seat 40.

The display device 100 allows the driver to view, for example, an image obtained by imaging information for assisting the driver's driving as a virtual image VI. The information for assisting the driver's driving includes, for example, information such as the speed of the vehicle M, the drive power distribution ratio, the engine speed, the operation state of driving support functions, shift positions, sign recognition results, and the positions of intersections. The driving support functions include, for example, a direction indicator function for guiding the vehicle M to a preset destination, an adaptive cruise control (ACC), a lane keep assist system (LKAS), a collision mitigation brake system (CMBS), and a traffic jam assist function. The driving support functions may also include, for example, a telephone function for managing telephone calls and call termination and origination, which is provided in the vehicle M.

The vehicle M may be provided with a first display 50-1 and a second display 50-2 in addition to the display device 100. The first display 50-1 is, for example, a display device which is provided on the instrument panel 30 in the vicinity of the front of the driver's seat 40 and which the driver can view through a gap in the steering wheel 10 or over the steering wheel 10. The second display 50-2 is attached to, for example, a central portion of the instrument panel 30. The second display 50-2 displays, for example, an image corresponding to a navigation process performed by a navigation device (not shown) mounted in the vehicle M or an image of another party on a videophone. The second display 50-2 may display television shows, play DVDs, and display content such as downloaded movies.

The vehicle M is provided with operation switches (examples of operation units) 130 that receive an instruction to switch the display of the display device 100 on/off or an instruction to adjust the position of the virtual image VI. The operation switches 130 are attached, for example, at a position where the driver seated on the driver's seat 40 can operate them without changing his or her position much. The operation switches 130 may be provided, for example, in front of the first display 50-1 or may be provided on a boss of the steering wheel 10, or may be provided on a spoke that connects the steering wheel 10 and the instrument panel 30.

Figure 2:
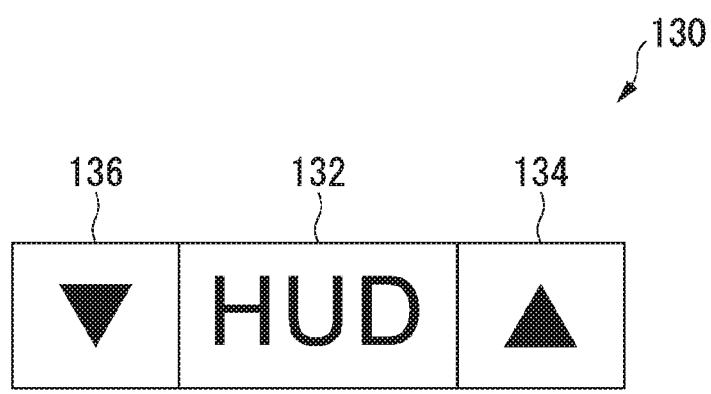
FIG. 2 is a diagram illustrating operation switches of an embodiment.

FIG. 2 is a diagram illustrating the operation switches 130 according to an embodiment. The operation switches 130 include, for example, a main switch 132 and adjustment switches 134 and 136. The main switch 132 is a switch for switching the display device 100 on/off.

The adjustment switch 134 is, for example, a switch for receiving an instruction to move the position of the virtual image VI, which is viewed from the driver's sight position P1 as being in a space after being transmitted through the displayable area A1, toward an upper side in the vertical direction Z (hereinafter referred to upward). The driver can continuously move the viewing position of the virtual image VI upward in the displayable area A1 by continuously pressing the adjustment switch 134.

The adjustment switch 136 is a switch for receiving an instruction to move the position of the virtual image VI described above toward a lower side in the vertical direction Z (hereinafter, referred to as downward). The driver can continuously move the viewing position of the virtual image VI downward in the displayable area A1 by continuously pressing the adjustment switch 136.

The adjustment switch 134 may be a switch for raising the brightness of the virtual image VI that is viewed, instead of (or in addition to) moving the position of the virtual image VI upward. The adjustment switch 136 may be a switch for lowering the brightness of the virtual image VI that is viewed, instead of (or in addition to) moving the position of the virtual image VI downward. The content of instructions received by the adjustment switches 134 and 136 may be switched based on a certain operation. The certain operation is, for example, a long press operation of the main switch 132. The operation switches 130 may include, for example, a switch for selecting the content to be displayed or a switch for adjusting only the brightness of a virtual image displayed, in addition to the switches shown in FIG. 2.

Figure 3:
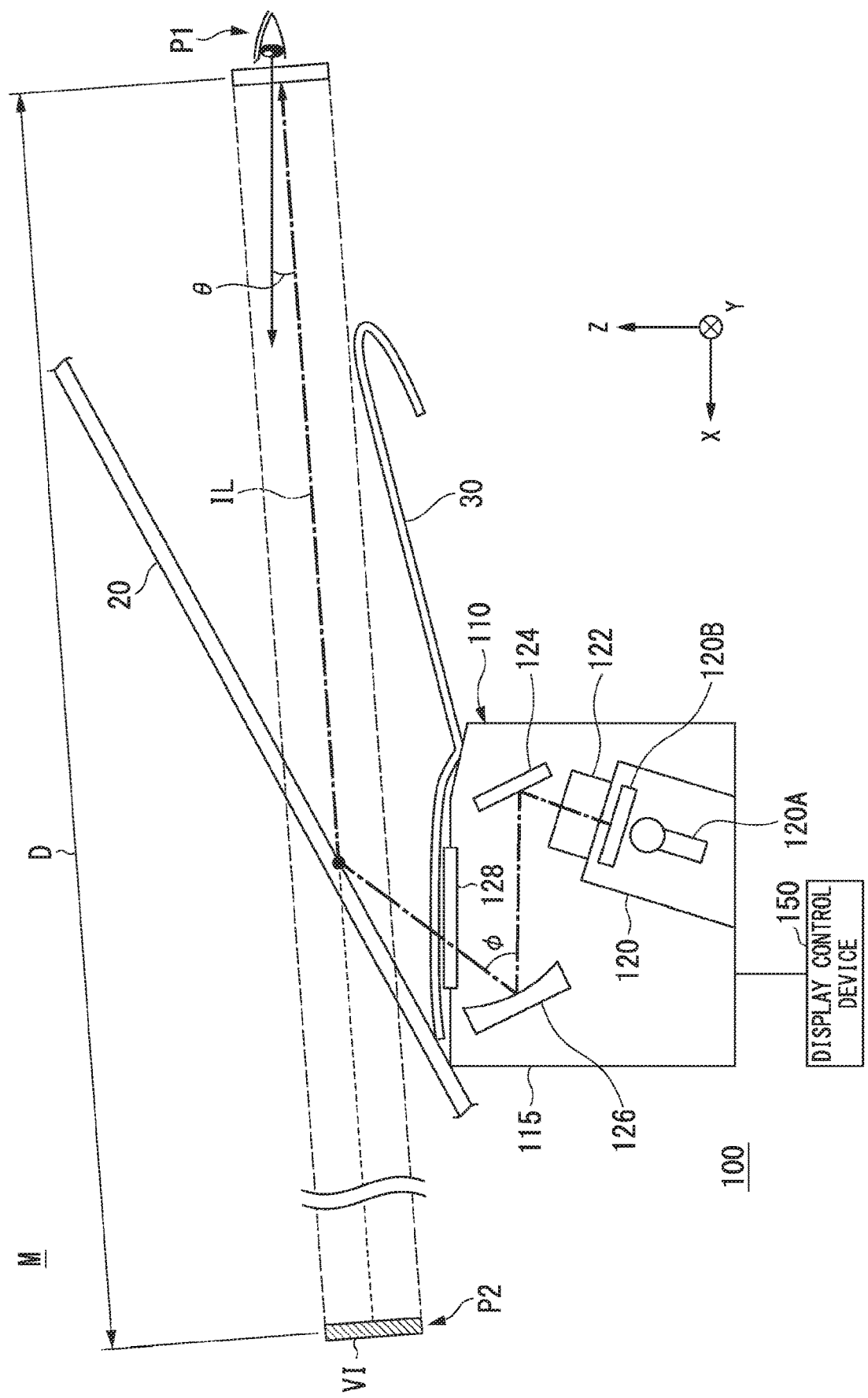
FIG. 3 is a partial configuration diagram of the display device.

FIG. 3 is a partial configuration diagram of the display device 100. The display device 100 includes, for example, a display (an example of the image generation device) 110 and a display control device 150. A combination of the display control device 150, the optical system controller 170, and the display controller 172 is an example of the "control device." The display 110 accommodates, for example, a light projecting device 120, an optical mechanism 122, a plane mirror 124, a concave mirror 126, and a light transmission cover 128 in a housing 115. The display device 100 includes various sensors and actuators, which will be described later, in addition to these components. The display device may also be configured without the optical mechanism 122.

The light projecting device 120 includes, for example, a light source 120A and a display element 120B. The light source 120A is, for example, a cold cathode tube and outputs visible light corresponding to the virtual image VI that is to be viewed by the driver. The display element 120B controls transmission of visible light from the light source 120A. The display element 120B is, for example, a thin film transistor (TFT) type liquid crystal display (LCD). The display element 120B controls each of a plurality of pixels to control the degree of transmission of visible light from the light source 120A for each color element, whereby image elements are included in the virtual image VI and the form (appearance) of the virtual image VI is determined. Hereinafter, visible light which is transmitted through the display element 120B and thus includes an image is referred to as image light IL. The display element 120B may be an organic EL display, in which case the light source 120A may be omitted.

The optical mechanism 122 includes, for example, one or more lenses. The positions of the lenses can be adjusted, for example, in the optical axis direction. The optical mechanism 122 is provided, for example, on the path of the image light IL output from the light projecting device 120, and transmits the image light IL that is incident thereon from the light projecting device 120 and then emits the light toward the front windshield 20. For example, by changing the positions of the lenses, the optical mechanism 122 can adjust the distance from the driver's sight position P1 to a formation position P2 at which the image light IL is formed as a virtual image (hereinafter referred to as a virtual image viewing distance D). The driver's sight position P1 is a position where the image light IL is collected by being reflected by the concave mirror 126 and the front windshield 20 and where it is assumed that the driver's eyes are present. Strictly, the virtual image viewing distance D is a distance of a line segment having an inclination in the vertical direction. However, in the following description, the distance in an expression such as "the virtual image viewing distance D is 7 meters" may mean a horizontal distance.

In the following description, a depression angle $\theta$ is defined as an angle between a horizontal plane passing through the driver's sight position P1 and the line segment extending from the driver's sight position P1 to the formation position P2. The further downward the virtual image VI is formed, that is, the further downward the direction of sight in which the driver looks at the virtual image VI, the larger the depression angle $\theta$. The depression angle $\theta$ is determined based on the reflection angle $\varphi$ of the concave mirror 126 and the display position of the original image on the display element 120B. The reflection angle $\varphi$ is an angle between the incident direction in which the image light IL reflected by the plane mirror 124 is incident on the concave mirror 126 and the emission direction in which the concave mirror 126 emits the image light IL.

The plane mirror 124 reflects the visible light emitted by the light source 120A and having passed through the display element 120B (that is, the image light IL) in a direction toward the concave mirror 126.

The concave mirror 126 reflects the image light IL that is incident thereon from the plane mirror 124 and emits it toward the front windshield 20. The concave mirror 126 is supported such that it is rotatable (pivotable) about a Y axis which is the axis in the lateral direction of the vehicle M.

The light transmission cover 128 transmits the image light IL from the concave mirror 126, such that the image light IL reaches the front windshield 20, while preventing the entry of foreign matter such as dust and dirt or water droplets into the housing 115. The light transmission cover 128 is provided in an opening formed in an upper member of the housing 115. The instrument panel 30 also has an opening or a light transmissive member, and the image light IL passes through the light transmission cover 128 and the opening or the light transmissive member of the instrument panel 30 and then reaches the front windshield 20.

The image light IL incident on the front windshield 20 is reflected by the front windshield 20 and collected at the driver's sight position P1. At this time, when the driver's eyes are located at the driver's sight position P1, the driver feels that an image formed by the image light IL is displayed in front of the vehicle M.

Figure 4:
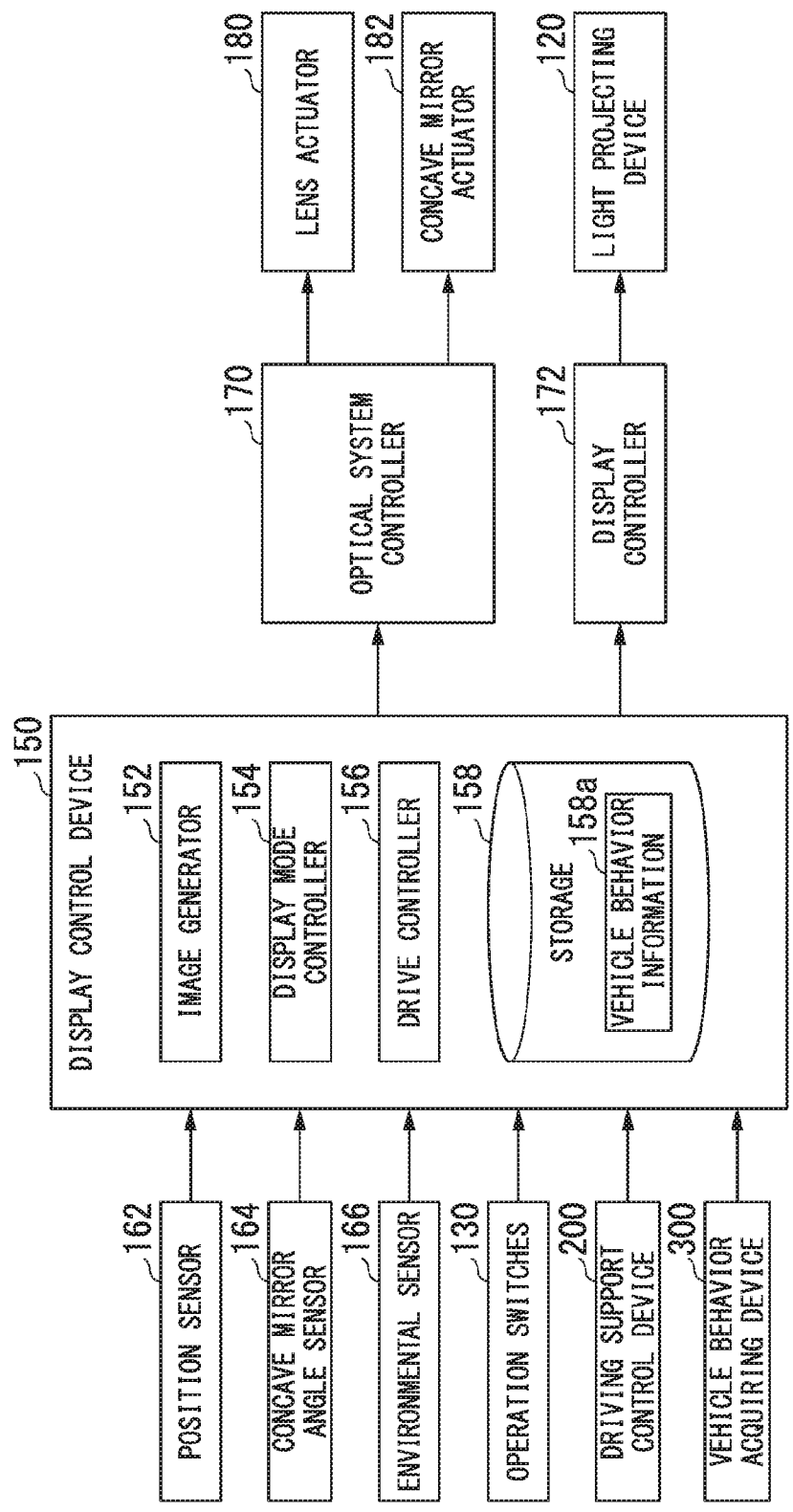
FIG. 4 is a diagram showing an exemplary configuration of the display device centering on a display control device.

The display control device 150 controls the display of the virtual image VI that is viewed by the driver. FIG. 4 is a diagram showing an exemplary configuration of the display device 100 centering on the display control device 150. In the example of FIG. 4, a position sensor 162, a concave mirror angle sensor 164, an environmental sensor 166, the operation switches 130, an optical system controller 170, a display controller 172, a lens actuator (an example of the first actuator) 180, a concave mirror actuator (an example of the second actuator) 182, the light projecting device 120, a driving support control device 200, and a vehicle behavior acquiring device 300, which are included in the display device 100, are shown in addition to the display control device 150. A combination of the lens actuator 180 and the concave mirror actuator 182 is an example of the "actuator." First, each component other than the display control device 150 will be described.

The position sensor 162 detects the positions of one or more lenses included in the optical mechanism 122. The position sensor 162 may also detect the position of the display element 120B. The concave mirror angle sensor 164 detects the rotation angle of the concave mirror 126 about the Y axis.

The environmental sensor 166 detects, for example, the temperatures of the light projecting device 120 and the optical mechanism 122. The environmental sensor 166 may detect the illuminance around the vehicle M, detect the speed and steering angle of the vehicle M, and detect objects (for example, obstacles such as other vehicles and pedestrians) that are present near the vehicle M. The environmental sensor 166 may also detect that the brake system or engine system of the vehicle needs to be inspected, that the headlights are set to high beam, that the doors are not locked, that the doors are not completely closed, that the fog lamp is lit, that an incoming call has arrived through the telephone function provided in the vehicle M, that it is close to the timing of turning right or left to go to a destination set in the navigation device, or the like. The environmental sensor 166 may acquire identification information identifying the driver, for example, by reading the driver's license with a scanner (not shown) or the like mounted in the vehicle M or allowing the driver to input it through an input device (not shown).

The optical system controller 170 adjusts the virtual image viewing distance D by driving the lens actuator 180 on the basis of a control signal output by the drive controller 156. The optical system controller 170 adjusts the rotation angle of the concave mirror by driving the concave mirror actuator 182 on the basis of a control signal output by the drive controller 156. By adjusting these, the optical system controller 170 adjusts a projection position on the projection surface of light projected from the light projecting device 120.

The display controller 172 controls the light projecting device 120 to output an image which is generated by the image generator 152 and is based on a display mode determined by the display mode controller 154. The image includes, for example, an image relating to basic support information for assisting the driver's driving that is displayed regularly (hereinafter referred to as a first image) or an image displayed upon an emergency or upon the occurrence of a predetermined event of a predetermined function or the like (hereinafter referred to as a second image). The basic support information is, for example, information for allowing the driver to recognize the speed of the vehicle M, the drive power distribution ratio, the engine speed, the operation state shift positions of driving support functions, sign recognition results, the positions of intersections, and the like. The predetermined event is, for example, an event that occurs depending on the state of the vehicle M. Events include those corresponding to various functions of the driving support control device 200 and those (inspection instructions and warnings) generated by information detected by the environmental sensor 166. The second image is, for example, an image relating to a lane departure warning, an image notifying that the vehicle M is approaching a preceding vehicle, an image indicating that a collision mitigation brake has been activated, or other warning images. The second image may be displayed interrupting the first image or may be displayed together with the first image.

The lens actuator 180 acquires a drive signal from the optical system controller 170 and drives a motor or the like on the basis of the acquired drive signal to move the positions of one or more lenses included in the optical mechanism 122. The lens actuator 180 may physically move the position of the display element 120B along the image light IL. The virtual image viewing distance D is adjusted in this manner.

The concave mirror actuator 182 acquires a drive signal from the optical system controller 170 and drives a motor or the like on the basis of the acquired drive signal to rotate the concave mirror actuator 182 about the Y axis to adjust the reflection angle (p of the concave mirror 126. The depression angle θ is adjusted in this manner.

The driving support control device 200 executes a driving support function that assists a driving operation of the driver of the vehicle M. When the driving support function is executed, the vehicle M performs, for example, one or both of steering control or speed control regardless of the driver's operations on driving operators (for example, the steering wheel 10, the accelerator pedal, and the brake pedal). For example, when executing the ACC as a driving support function, the driving support control device 200 performs acceleration/deceleration control (speed control) based on the inter-vehicle distance between the vehicle and a preceding vehicle such that the vehicle M travels with the inter-vehicle distance between the vehicle and the preceding vehicle kept constant on the basis of information input through the environmental sensor 166 or an object recognition device (not shown) mounted in the vehicle M. When executing the LKAS as a driving support function, the driving support control device 200 performs steering control such that the vehicle M travels while maintaining the travel lane in which the vehicle is currently traveling (lane keeping). When executing the CMBS as a driving support function, the driving support control device 200 performs deceleration control or stopping control of the vehicle M when the inter-vehicle distance between the vehicle M and the preceding vehicle becomes less than a predetermined distance. For example, the driving support control device 200 outputs states of the driving support functions to the display control device 150. The driving support control device 200 outputs information (warning information) for warning the driver to the display control device 150 before executing the LKAS or CMBS. The warning information is, for example, a lane departure warning or a preceding vehicle approach warning. When the various functions described above are executed by the driving support control device 200, events corresponding to the various functions occur.

For each driver who drives the vehicle M, the vehicle behavior acquiring device 300 acquires a behavior of the vehicle M corresponding to a driving operation performed by the driver. The behavior of the vehicle M is, for example, information relating to the speed, yaw rate, lateral acceleration, steering, or the like of the vehicle M corresponding to an operation of a driving operator performed by the driver. The behavior of the vehicle M includes, for example, information regarding the magnitude of a vehicle speed fluctuation, the inter-vehicle distance between the preceding vehicle and the vehicle M acquired by the environmental sensor 166, or the like. The vehicle speed fluctuation is, for example, the frequency of deceleration, acceleration, or acceleration/deceleration of the vehicle M during a predetermined time. The inter-vehicle distance is, for example, an average inter-vehicle distance in traveling in a section from a departure point to an arrival point set in the navigation device. The inter-vehicle distance may be an average inter-vehicle distance at predetermined time intervals.

For example, the information acquired by the vehicle behavior acquiring device 300 is stored in the storage 158 of the display control device 150 as vehicle behavior information 158a. FIG. 5 is a diagram showing an example of the content of the vehicle behavior information 158a. In the vehicle behavior information 158a, the date and time when the behavior of the vehicle M is acquired and the behavior content of the vehicle M are associated with identification information of the driver. The behavior content includes, for example, information relating to vehicle speed fluctuations, information relating to the inter-vehicle distance to the preceding vehicle and steering, information relating to yaw rate fluctuations that the vehicle M has undergone, and information relating to lateral acceleration fluctuations that the vehicle M has undergone. The date and time may be the acquisition time of the vehicle behavior information 158a or the travel time from the departure point to the arrival point. The driver may be identified not only at a specific moment but also at the time of a series of movements or at the timing of a series of operations. For example, the driver may be identified according to the timing at which a turn starts at an intersection, the timing at which a turn ends, the timing of starting acceleration, the time required for each of these, or the like.

[Display Control Device]

Next, the display control device 150 will be described. The display control device 150 includes, for example, an image generator 152, a display mode controller 154, a drive controller 156, and a storage 158. Each of these components other than the storage 158 is realized, for example, by a hardware processor such as a central processing unit (CPU) executing a program (software). Some or all of these components may be realized by hardware (including circuitry) such as a large scale integration (LSI), an application specific integrated circuit (ASIC), a field-programmable gate array (FPGA), or a graphics processing unit (GPU) or may be realized by hardware and software in cooperation. The program may be stored in advance in the storage 158 such as an HDD or a flash memory of the display control device 150 or may be stored in a detachable storage medium such as a DVD or a CD-ROM and then installed in the storage 158 of the display control device 150 by inserting the storage medium into a drive device.

For example, the display control device 150 enables each of the functions of the image generator 152, the display mode controller 154, and the drive controller 156 when a signal for turning on has been received through the operation switch 130 (the main switch 132) and stops each of the functions when a signal for turning off has been received.

The image generator 152 generates a first image to be superimposed on the landscape and viewed by the driver when the display device 100 is on. The image generator 152 generates a second image instead of (in addition to) the first image when the interrupt determiner 153 has determined that a second image is to interrupt the image superimposed on the landscape. The driver may set the output of the first and second images to be displayed using the operation switch 130, another operation unit, a graphical user interface (GUI) switch displayed on the second display 50-2, or the like. The setting information that has been set by the driver is stored, for example, in the storage 158. For example, when warning information has been output by the driving support control device 200, the image generator 152 generates an image element based on the occurrence of an event of outputting warning information. The image element includes, for example, an icon identifying content or details of content, a mark, or a road sign.

The display mode controller 154 controls a display mode of the image generated by the image generator 152. The display mode is the presence/absence of display of the image (first and second images) superimposed on the landscape and viewed by the driver, the position of the image when it is displayed (the depression angle $\theta$), the size, the brightness, the virtual image viewing distance D, or the like. For example, the display mode controller 154 changes the display mode on the basis of the positions of the lenses detected by the position sensor 162 and the rotation angle of the concave mirror 126 detected by the concave mirror angle sensor 164. The display mode controller 154 may change the display mode on the basis of the information detected by the environmental sensor 166 and the content (or details) of the driving support functions provided by the driving support control device 200.

The display mode controller 154 may perform shake correction control for curbing fluctuations in the depression angle $\theta$ caused by the behavior of the vehicle M (more specifically, for curbing shaking of the virtual image VI). For example, when the vehicle M passes along a road with a ramp or the like, the vehicle M is tilted forward or backward, such that the virtual image VI viewed from the driver shakes downward or upward, which may reduce the visibility. Thus, when a change in the behavior of the vehicle M as described above is detected, the display mode controller 154 performs control such that the depression angle $\theta$ is constant.

Specifically, the display mode controller 154 calculates, for example, the difference between a depression angle (first depression angle) $\theta 1$ before the behavior of the vehicle M has changed due to a ramp and a depression angle (second depression angle) $\theta 2$ after the behavior has changed and performs correction control of the depression angle $\theta$ such that the calculated difference approximates zero. The display mode controller 154 may also calculate a vertical fluctuation range of the vehicle M on the basis of the depression angle $\theta 1$ before the behavior has changed and the depression angle $\theta 2$ after the behavior has changed and perform correction control of the depression angle $\theta$ such that the calculated fluctuation range approximates zero.

When the display mode controller 154 performs correction of the depression angle $\theta$ using the concave mirror actuator 182, the response is delayed due to the influence of the motor driving time or the like. Therefore, a time lag occurs between the timing of the change in the behavior of the vehicle M and the timing of the correction control of the depression angle $\theta$, and thus the virtual image VI may shake up and down contrary to the shaking directions of the vehicle M. Thus, under the conditions described above or the like, the display mode controller 154 performs correction control of the depression angle $\theta$ by adjusting the projection position on the projection surface of light projected from the light projecting device 120 through display control of the display controller 172 having high responsiveness. Thereby, the shake correction of the depression angle $\theta$ can be performed at more appropriate timings. The display mode controller 154 may combine the position correction control described above with position control through driving of the lens actuator 180 and the concave mirror actuator 182 by the optical system controller 170.

The drive controller 156 generates a control signal for moving the positions of one or more lenses included in the optical mechanism 122 or the position of the display element 120B and a control signal for adjusting the rotation angle of the concave mirror 126 on the basis of the control information from the display mode controller 154 and outputs the generated control signals to the optical system controller 170. On the basis of the positions of the lenses or the position of the display element 120B detected by the position sensor 162 and the rotational angle of the concave mirror 126 detected by the concave mirror angle sensor 164, the drive controller 156 generates the control signals such that the virtual image VI including the image is viewed at a position (with the depression angle $\theta$ and the virtual image viewing distance D) indicated by the display mode controller 154 and outputs the generated control signals to the optical system controller 170. Details of the drive controller 156 will be described later.

The storage 158 is realized, for example, by a read only memory (ROM), a random access memory (RAM), a hard disk drive (HDD), or a flash memory. The storage 158 stores, for example, the vehicle behavior information 158a, the setting information, and other information.

Figure 6:
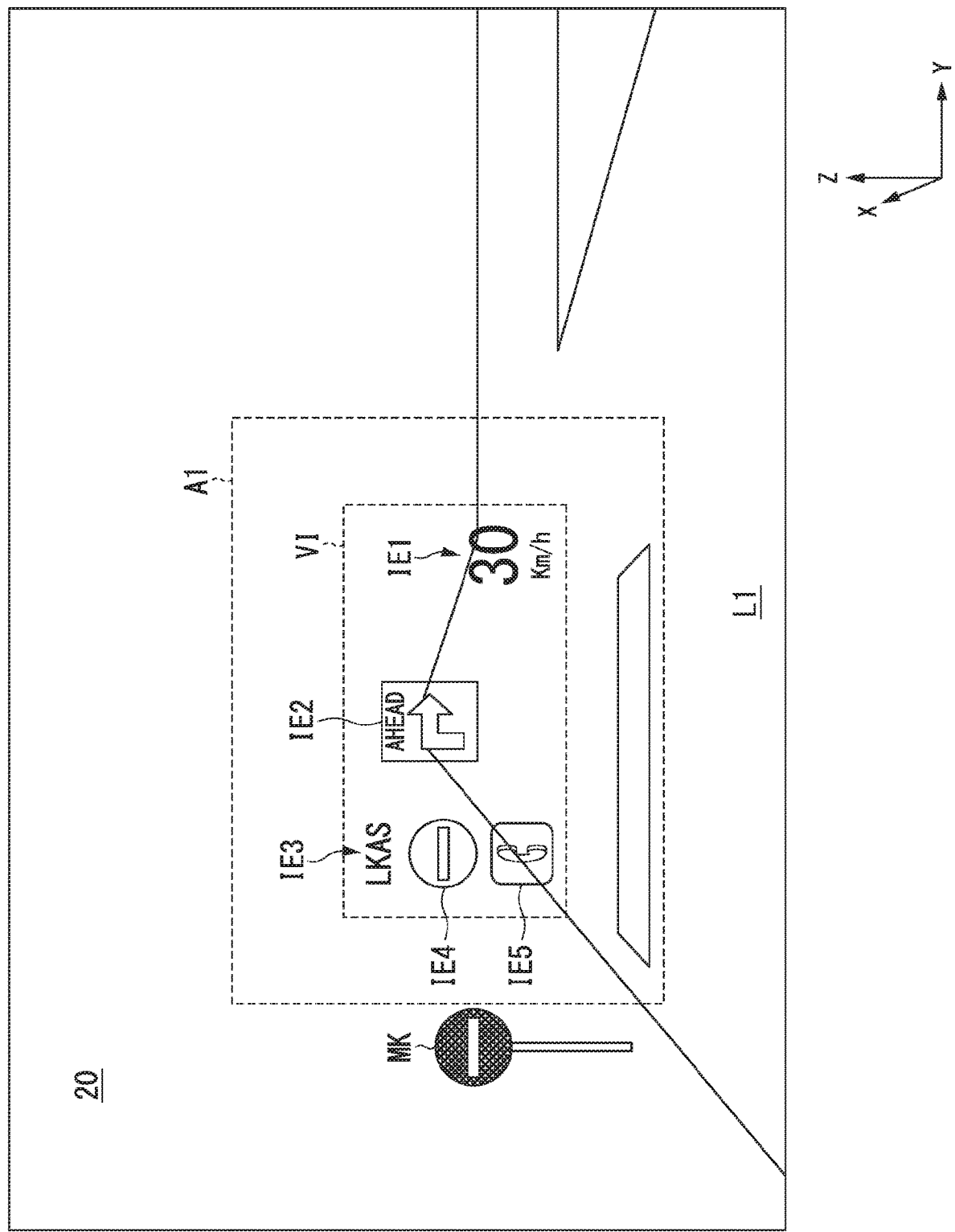
FIG. 6 is a diagram showing an example of a virtual image superimposed on a landscape.

Next, an example of an image superimposed on a landscape by the display device 100 which is visible to the driver as a virtual image VI will be described. FIG. 6 is a diagram showing an example of a virtual image VI superimposed on a landscape. In the example of FIG. 6, it is assumed that the vehicle M is traveling on a road L1. The example of FIG. 6 shows an example of a virtual image VI superimposed on a landscape (a landscape in a real space where a road L1, a sign MK, and the like are present) by the display device 100 which is viewed through the front windshield 20.

The virtual image VI includes one or more image elements IE. The image elements IE include, for example, the first image or the second image described above. In the example of FIG. 6, an image element IE1 indicates the speed of the vehicle M and is an example of the first image. An image element 1E2 indicates a direction indicator, an image element 1E3 indicates the type of a driving support function being executed, an image element 1E4 indicates a sign, and an image element IE5 indicates an incoming call with the telephone function provided in the vehicle M, each of which is an example of the second image.

The display mode controller 154 causes the light projecting device 120 to output an image including image elements corresponding to states of the vehicle after the display device 100 is activated (when the display device 100 is on). The following is a detailed description with reference to the example of FIG. 6. For example, the image generator 152 generates an image element IE1 when the display device 100 has been activated. In this case, the display mode controller 154 causes the generated image element IE1 to be displayed on the lower right of the virtual image VI when viewed from the driver.

When the vehicle M is traveling near an intersection, the image generator 152 generates an image including an image element IE2 corresponding to an instruction to display direction indicator information issued by the driving support function of the driving support control device 200. In this case, the display mode controller 154 causes the image element IE2 to be displayed at the center of the virtual image VI. When the driving support control device 200 has determined that the vehicle M may depart from the lane of the road L1, the image generator 152 generates an image element IE3 corresponding to the letters "LKAS." In this case, the display mode controller 154 causes the generated image element IE3 to be displayed on the upper left of the virtual image VI. When the environmental sensor 166 has recognized a predetermined sign MK in front of the vehicle M, the image generator 152 generates an image element IE4 corresponding to the sign. The predetermined sign MK is, for example, a sign such as temporary stop, maximum speed (speed limit), no vehicle entry, no lane departure, or one-way passage. In this case, the display mode controller 154 causes the generated image element IE4 to be displayed at the left center of the virtual image VI. Upon receiving an incoming call through the telephone function provided in the vehicle M, the image generator 152 generates an image element IE5 corresponding to an image indicating the incoming call. In this case, the display mode controller 154 causes the generated image element IE5 to be displayed on the lower left of the virtual image VI. When the display conditions of an image element IE are not satisfied, the display mode controller 154 ends the display of the image element IE.

Next, details of the drive controller 156 will be described. For example, the drive controller 156 changes the depression angle θ and the virtual image viewing distance D for the virtual image VI shown in FIG. 6 on the basis of the speed of the vehicle M (hereinafter referred to as a speed MV).

By driving the motor of the lens actuator 180 according to the speed MV, the drive controller 156 linearly drives the positions of one or more lenses included in the optical mechanism 122 or the display element 120B along the optical path of image light IL to adjust the virtual image viewing distance D. For example, the drive controller 156 increases the virtual image viewing distance D as the speed MV increases and decreases the virtual image viewing distance D as the speed MV decreases. Further, the drive controller 156 may change the virtual image viewing distance D within the set range, the set range having a maximum value (for example, about 15 meters) and a minimum value (for example, about 5 meters) of the virtual image viewing distance D.

The drive controller 156 rotates the concave mirror 126 about the Y axis by driving the motor of the concave mirror actuator 182 according to the speed MV of the vehicle M to adjust the reflection angle φ of the concave mirror 126 and the depression angle θ. For example, using a second vehicle speed filter, the drive controller 156 moves the virtual image VI in the upward (+Z) direction shown in FIG. 6 to decrease the depression angle θ as the speed MV increases and conversely, moves the virtual image VI in the downward (−Z) direction to increase the depression angle θ as the speed MV decreases. Further, the drive controller 156 changes the depression angle θ within the set range, the set range having a maximum value and a minimum value of the depression angle θ such that the virtual image VI is displayed in the displayable area A1.

Here, for example, based on the speed MV, the drive controller 156 uses a first vehicle speed filter (Filter A) to perform variable control of the virtual image viewing distance D by the lens actuator 180 and uses a second vehicle speed filter (Filter B) to perform variable control of the depression angle θ by the concave mirror actuator 182. Each of the vehicle speed filters is, for example, a temporary delay filter or a moving average filter. For example, in the case of a temporary delay filter, the responsiveness increases as the time constant increases and decreases as the time constant decreases. In the case of a moving average filter, the responsiveness increases as the sampling frequency decreases and decreases as the sampling frequency increases. The vehicle speed filters may be derived, for example, by PID control of motors included in the actuators. In this case, the responsiveness increases as the gain of the differential term in the equation of the PID control of the sampling method increases.

The drive controller 156 may calculate the depression angle θ and the virtual image viewing distance D by using functions such as f(x) and g(x) shown below such that the depression angle θ and the virtual image viewing distance D described above are smoothly moved according to the speed MV.

Virtual image viewing distance $D=f(\text{Filter}A(MV))$

Depression angle $\theta=g(\text{Filter}B(MV))$

Figure 7:
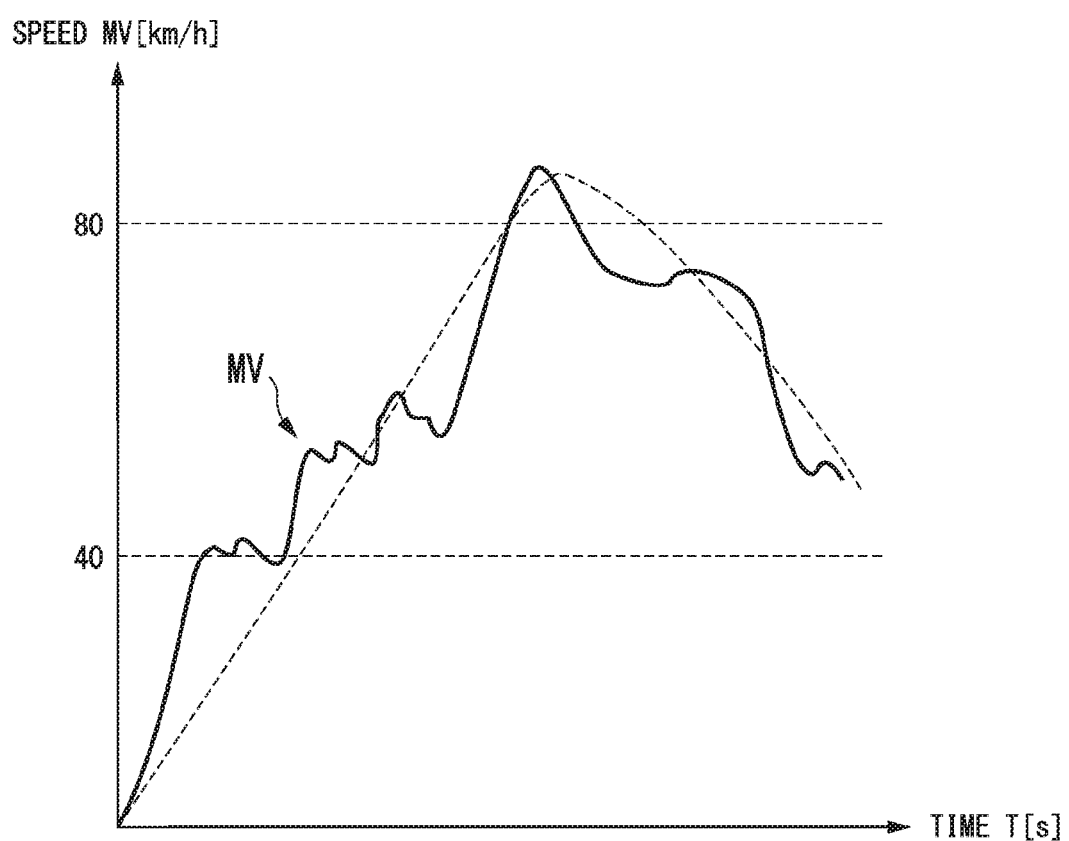
FIG. 7 is a diagram showing how vehicle speed filters are used for vehicle speed fluctuations.

FIG. 7 is a diagram showing how vehicle speed filters are used for vehicle speed fluctuations. In FIG. 7, the horizontal axis represents time T[sec] passing as the vehicle M travels and the vertical axis represents the speed MV[km/h]. For example, when the speed MV greatly fluctuates as shown in FIG. 7, the virtual image viewing distance D and the depression angle θ frequently change. Therefore, a changing value of the speed MV as indicated by a dotted line shown in FIG. 7 can be obtained using the first vehicle speed filter or the second vehicle speed filter, and the virtual image viewing distance D and the depression angle θ can be adjusted on the basis of the changing value. This can reduce the number of times the motors of the actuators are activated and thus can improve the durability thereof and can also smoothen changes in the position of the virtual image VI that is displayed visible to the driver.

When changing the virtual image viewing distance D, one or more lenses included in the optical mechanism 122 or the display element 120B are linearly driven, thus increasing the burden on the members. Therefore, the drive controller 156 makes the responsiveness in the drive control of the concave mirror actuator 182 higher than the responsiveness in the drive control of the lens actuator 180. Thereby, the variable control of the depression angle θ by the concave mirror actuator 182 with a small burden on the members is executed with priority over the variable control of the virtual image viewing distance D by the lens actuator 180. Therefore, it is possible to realize smooth changes in the display position of the virtual image VI according to the speed MV, reduce the number of times the lens actuator 180 with a great burden on the members is driven, and improve the durability of the actuators.

For example, brushed DC motors or brushless motors can be used as the motors included in the lens actuator 180 and the concave mirror actuator 182. When brushless motors are used, durability can be improved and activation sound, vibration, and noise can be curbed as compared to when brushed DC motors are used. Even when brushed DC motors are used, the activation sound, vibration, and noise can be curbed by adjusting the responsiveness on the basis of the vehicle speed filters as described above.

The drive controller 156 may change the responsiveness of the second vehicle speed filter on the basis of the vehicle behavior information 158a stored in the storage 158. For example, the drive controller 156 refers to the vehicle behavior information 158a on the basis of identification information of the driver acquired by the environmental sensor 166 or the like to acquire behavior content associated with the matching driver identification information. Then, the drive controller 156 changes the responsiveness of the second vehicle speed filter such that the responsiveness is lowered when the behavior content satisfies a predetermined condition. The predetermined condition is, for example, that it be estimated that the number of times the motor of the lens actuator 180 is activated is great due to changes in the vehicle speed. Specifically, the predetermined condition is that the magnitude of a fluctuation of the speed MV be greater than or equal to a first threshold value, that the inter-vehicle distance between a preceding vehicle and the vehicle M be equal to or less than a second threshold value, or the like.

Since frequent driving of the motor of the lens actuator 180 can be curbed using a filter with low responsiveness as described above, the durability of the motor can be further improved. Since frequent changes in the virtual image viewing distance D can also be curbed, it is possible to allow the driver to easily view the virtual image VI.

[Process Flow]

Figure 8:
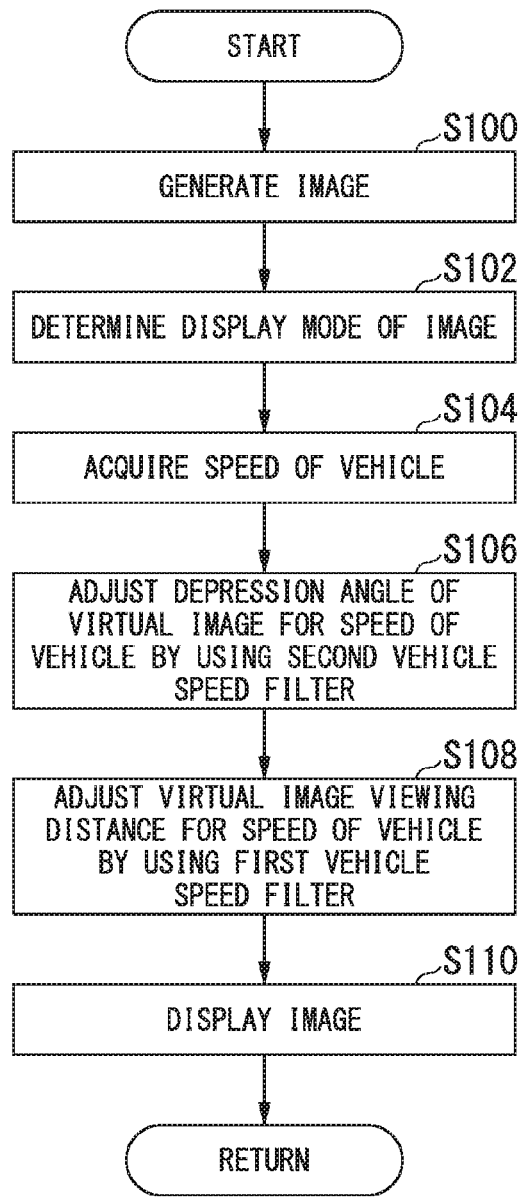
FIG. 8 is a flowchart showing a flow of a process executed by a display device according to an embodiment.

FIG. 8 is a flowchart showing a flow of a process executed by the display device 100 according to an embodiment. For example, the process of FIG. 8 is repeatedly executed at predetermined timings after the display device 100 is turned on by the operation switch 130.

First, the image generator 152 generates an image to be superimposed on a landscape on the basis of setting information stored in the storage 158 or the like (step S100). Next, the display mode controller 154 determines a display mode of the generated image (step S102).

Next, the drive controller 156 acquires the speed MV of the vehicle M (step S104) and adjusts the depression angle θ of a virtual image VI for the speed MV of the vehicle M (specifically, a virtual image VI including the image which has been generated by the image generator 152 and whose display mode has been determined by the display mode controller 154) by using the second vehicle speed filter with higher responsiveness than the first vehicle speed filter (step S106). The drive controller 156 adjusts the viewing distance of the virtual image VI (the virtual image viewing distance D) for the speed MV of the vehicle by using the first vehicle speed filter with lower responsiveness than the second vehicle speed filter on the basis of the speed acquired by the process of step S104 (step S108). Next, the drive controller 156 causes the image generated by the image generator 152 to be displayed at the adjusted depression angle and virtual image viewing distance in the display mode determined by the display mode controller 154 (step S110). Then, the process of this flowchart ends.

According to the embodiment described above, the display device 100 includes the light projecting device 120 that outputs light including an image, the optical mechanism 122 that is provided on a light path and that can adjust the virtual image viewing distance D from a predetermined position to a position where the light is formed as a virtual image, the concave mirror 126 that reflects light that has passed through the optical mechanism 122 toward the reflector, the actuator that adjusts the distance in the optical mechanism 122, and the display control device 150 that controls the light projecting device 120 and the actuator, wherein the display control device 150 causes the actuator to be driven on the basis of the speed MV of the vehicle M to adjust the projection position on the projection surface of light projected from the light projecting device 120, whereby the durability can be improved.

Instead of projecting an image directly on the front windshield 20, the display device 100 may project an image on a light transmissive reflective member such as a combiner provided between the front windshield 20 and the position of the driver.

Although the mode for carrying out the present invention has been described above by way of embodiments, the present invention is not limited to these embodiments at all and various modifications and substitutions may be made without departing from the spirit of the present invention.

What is claimed is:

1. A display device mounted in a vehicle, the display device comprising:
    a light projecting device configured to project light including an image;
    an optical mechanism provided on a path of the light;
    an actuator configured to drive the optical mechanism to adjust a distance from a predetermined position to a position where the light is formed as a virtual image; and
    a control device configured to control the light projecting device and the actuator,
    wherein the control device is configured to drive the actuator on the basis of a speed of the vehicle to adjust a projection position on a projection surface of the light projected from the light projecting device,
    the control device is configured to lower responsiveness relating to drive control of the actuator when a behavior of the vehicle corresponding to an operation of a driver of the vehicle satisfies a predetermined condition as compared to when the behavior does not satisfy the predetermined condition, and
    the predetermined condition is that a magnitude of a fluctuation of the speed of the vehicle be greater than or equal to a first threshold value or that an inter-vehicle distance between the vehicle and a preceding vehicle be equal to or less than a second threshold value.

2. The display device according to claim 1, wherein the control device is configured to drive the actuator to increase the distance as the speed of the vehicle increases and to decrease the distance as the speed of the vehicle decreases.

3. The display device according to claim 1, wherein the control device is configured to drive the actuator to decrease an angle formed between a horizontal plane passing through a viewer's sight position and a line segment from the sight position to the position where the light is formed as the virtual image as the speed of the vehicle increases and to increase the angle as the speed of the vehicle decreases.

4. A display control method for a display device including a light projecting device configured to project light including an image, an optical mechanism provided on a path of the light, an actuator configured to drive the optical mechanism to adjust a distance from a predetermined position to a position where the light is formed as a virtual image, and a control device configured to control the light projecting device and the actuator, the display control method comprising:
the display device acquiring a speed of a vehicle in which the display device is mounted; and
driving the actuator on the basis of the acquired speed of the vehicle to adjust a projection position on a projection surface of the light projected from the light projecting device,
the control device is configured to lower responsiveness relating to drive control of the actuator when a behavior of the vehicle corresponding to an operation of a driver of the vehicle satisfies a predetermined condition as compared to when the behavior does not satisfy the predetermined condition, and
the predetermined condition is that a magnitude of a fluctuation of the speed of the vehicle be greater than or equal to a first threshold value or that an inter-vehicle distance between the vehicle and a preceding vehicle be equal to or less than a second threshold value.

5. A computer-readable non-transitory storage medium storing a program causing a display device including a light projecting device configured to project light including an image, an optical mechanism provided on a path of the light, an actuator configured to drive the optical mechanism to adjust a distance from a predetermined position to a position where the light is formed as a virtual image, and a control device configured to control the light projecting device and the actuator to:
acquire a speed of a vehicle in which the display device is mounted; and
drive the actuator on the basis of the acquired speed of the vehicle to adjust a projection position on a projection surface of the light projected from the light projecting device,
the control device is configured to lower responsiveness relating to drive control of the actuator when a behavior of the vehicle corresponding to an operation of a driver of the vehicle satisfies a predetermined condition as compared to when the behavior does not satisfy the predetermined condition, and
the predetermined condition is that a magnitude of a fluctuation of the speed of the vehicle be greater than or equal to a first threshold value or that an inter-vehicle distance between the vehicle and a preceding vehicle be equal to or less than a second threshold value.

6. The display device according to claim 1, further comprising:
a convex mirror that reflects light that has passed through the optical mechanism towards a reflector,
the actuator comprising:
a first actuator configured to drive the optical mechanism to adjust the distance from the predetermined position to the position where the light is formed as the virtual image; and
a second actuator configured to drive the convex mirror to adjust the distance from the predetermined position to the position where the light is formed as the virtual image, and
the control device makes the responsiveness in the drive control of the second actuator higher than the responsiveness in the drive control of the first actuator.

7. The display control method according to claim 4, further comprising:
a convex mirror that reflects light that has passed through the optical mechanism towards a reflector,
the actuator comprises a first actuator configured to drive the optical mechanism to adjust the distance from the predetermined position to the position where the light is formed as the virtual image and a second actuator configured to drive the convex mirror to adjust the distance from the predetermined position to the position where the light is formed as the virtual image, and
the control device makes the responsiveness in the drive control of the second actuator higher than the responsiveness in the drive control of the first actuator.

8. The computer-readable non-transitory storage medium storing a program according to claim 5, further comprising:
a convex mirror that reflects light that has passed through the optical mechanism towards a reflector,
the actuator comprises a first actuator configured to drive the optical mechanism to adjust the distance from the predetermined position to the position where the light is formed as the virtual image and a second actuator configured to drive the convex mirror to adjust the distance from the predetermined position to the position where the light is formed as the virtual image, and
the control device makes the responsiveness in the drive control of the second actuator higher than the responsiveness in the drive control of the first actuator.

9. The display device according to claim 1, further comprising:
a vehicle behavior acquiring device configured to acquire a behavior of the vehicle corresponding to a driving operation performed by the driver,
wherein the control device changes the responsiveness of the actuator for each driver based on the information obtained by the vehicle behavior acquiring device.

10. The display control method according to claim 4, further comprising:
a vehicle behavior acquiring device configured to acquire a behavior of the vehicle corresponding to a driving operation performed by the driver,
wherein the control device changes the responsiveness of the actuator for each driver based on the information obtained by the vehicle behavior acquiring device.

11. The computer-readable non-transitory storage medium storing a program according to claim 5, further comprising:
a vehicle behavior acquiring device configured to acquire a behavior of the vehicle corresponding to a driving operation performed by the driver,
wherein the control device changes the responsiveness of the actuator for each driver based on the information obtained by the vehicle behavior acquiring device.

* * * * *